April 18, 1961     R. R. DI GIANTOMASSO     2,980,247
BUTTER HOLDER AND DISPENSER
Filed Sept. 2, 1959
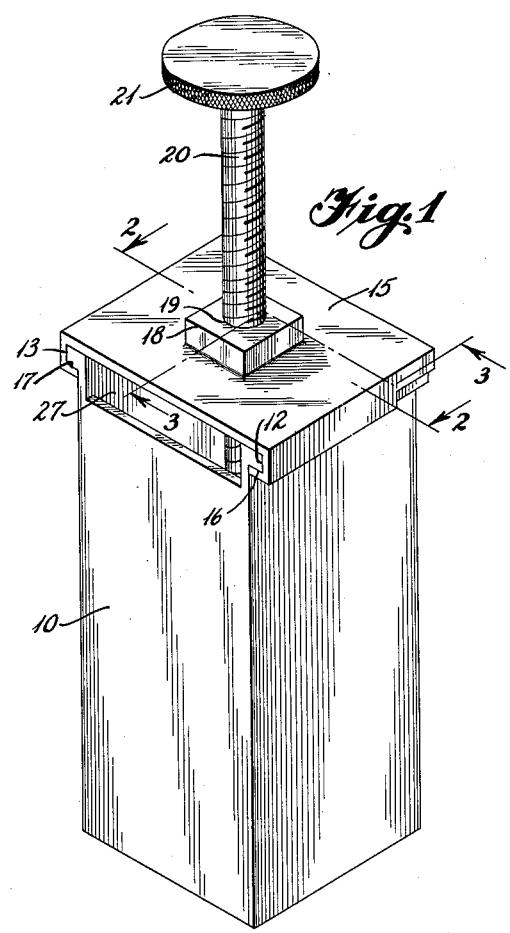
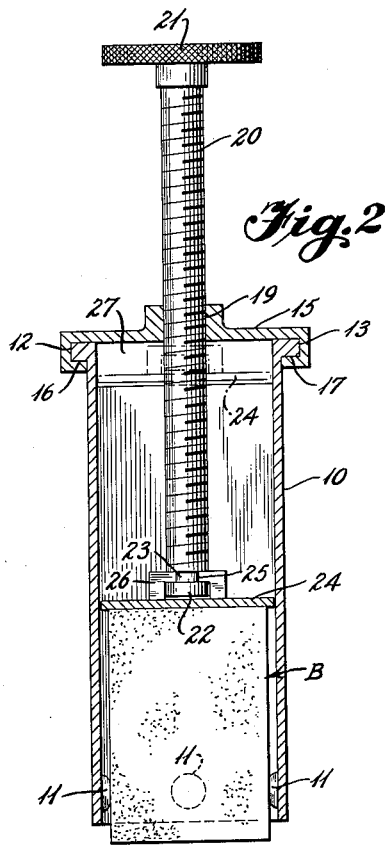
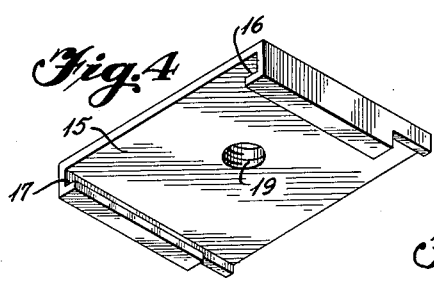
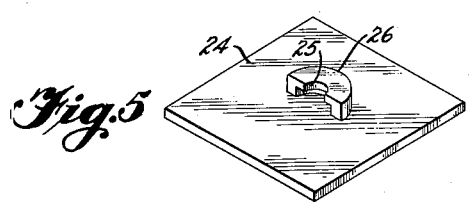
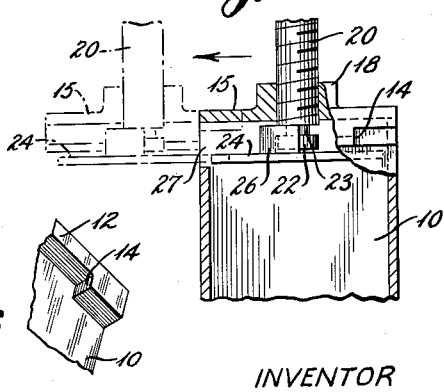
INVENTOR
ROBERT R. DI GIANTOMASSO
BY *A. Yates Dewell*
                   ATTORNEY

United States Patent Office 2,980,247
Patented Apr. 18, 1961

2,980,247

BUTTER HOLDER AND DISPENSER

Robert R. Di Giantomasso, 968 East H St., Ontario, Calif.

Filed Sept. 2, 1959, Ser. No. 837,681

1 Claim. (Cl. 206—56)

This invention relates to foods of various kinds, to the preparation and serving of the same, and more particularly to containers and equipment including holders by which such foods are served or dispensed.

The invention relates especially to the containing and dispensing of materials, the consistency of which is relatively soft such as butter or the like and employed for seasoning foods to render them more palatable and for other purposes.

It has been customary to serve butter in large or small amounts and to apply butter to food by means of a knife but due to differences in temperature and consequent variations in consistency, butter has not been easy to handle, with frequent dropping, soiling the hands and the apparel.

It is an object of the invention to solve the problem of handling butter or material of similar character and consistency by the provision of a holder for an elongated stick of butter with flat sides or square in cross-section, one end of the holder being open for dispensing the product and with expelling means for forcing the product from such open end.

Another object of the invention is to provide an elongated holder for a stick of butter or the like and which holder has flat sides or is square in cross-section and has a closure for one end, a piston beneath the closure, and a screw threaded through the closure and detachably engaged with the piston for forcing the contents of the holder endwise toward its opposite open end.

A further object of the invention is to provide an elongated hollow holder with an open discharge end provided with inwardly disposed projections to keep the stick of butter or other material from accidentally falling out of the holder and with the opposite end of the holder externally flanged for the reception of a cap having opposed flanges adapted to be applied transversely to bring the flanges of the cap beneath the flanges of the holder and with such cap having an opening through its center and receiving a screw so that a piston may be disposed in the holder and engaged by the screw for forcing the mass within the container toward the open end of the same, and with such screw having a knurled operating knob or disk on its extremity and a connection with a piston at its opposite extremity.

Other objects and advantages of the invention will be apparent from the following description taken in conjunction with the accompanying drawing wherein:

Fig. 1 is a perspective illustrating one application of the invention;

Fig. 2, a longitudinal section on the line 2—2 of Fig. 1;

Fig. 3, a fragmentary detail illustrating the manner of connecting the cap with the body of the holder;

Fig. 4, a perspective of the cap itself;

Fig. 5, a perspective of the piston; and

Fig. 6, a detail perspective of the corner of the holder.

Briefly stated the holder of the present invention is an elongated hollow body the interior of which has flat sides or is square in cross-section and with an inwardly disposed projection or protuberance centrally of each wall near one end and with the opopsite end of the body having external flanges on two sides with shoulders forming stops adjacent the ends of such flanges and with a closure for such end of the body having a pair of complementary inturned flanges for receiving the outwardly turned flanges on the body. The center of the closure has a central thickened portion with a threaded opening in which is received an externally threaded shaft or screw adapted to be rotated to move the screw axially of the body and with a knurled operating head at one end and a piston of square cross-section corresponding to the interior of the body at the other end and with a flanged connection for disposition in a groove in the end of the screw so that by rotating the head of the screw the piston can be moved endwise within said body, whereby butter or the like substance within the body may be dispelled from the discharge or applicator end thereof, the device being relatively small and useful for applying butter to toast, corn on the cob, cooking vessels such as frying pans, cake and pie tins and the like for the instant melting produced by friction or heat.

With continued reference to the drawing, a hollow holder body or housing 10 is provided having flat sides defining a hollow interior which is square in cross-section open at its ends.

On its inner surface near its discharge end each of the sides of said hollow body is provided with an inwardly extending projection or protuberance 11 to provide pressure points for holding butter B from accidentally falling from the housing 10.

The housing is provided opposite its discharge end with outwardly extending flanges 12 and 13, the flange 12 having an abutment or stop 14 (Fig. 6) and the flange 13 having a similar stop.

A closure 15 is provided for the end of the housing, such closure having opposed inwardly extending flanges 16 and 17 spaced from the underside of the closure a sufficient amount to receive within said inturned flanges the flanges 12 and 13 on the housing 10, the flanges 16 and 17 corresponding in length to that of the flanges 12 and 13 and extending from the abutments on such flanges so that when the closure is applied the end of the flange 16 will engage the abutment 14 and in like manner the flange 17 will engage the cooperating abutment on the housing or hollow body.

The closure is provided with a thickened central portion 18 with a threaded opening 19 in which is received a screw or externally threaded shaft 20 having an enlarged marginal or peripheral knurled head 21 by which the screw can be gripped and rotated. The opposite end of the screw 20 is provided with a head 22 and a groove 23 such head adapted to engage a piston or pressure plate 24 and receive within the groove 23 the flange 25 of a connecting collar 26 of semi-circular form so that it can be readily laterally applied and connected to the end of the screw.

In the assembly of the structure the butter is placed within the hollow body, the piston or pressure plate 24 is applied and the cap or closure with the threaded shaft screwed through the opening 19 in the thickened portion thereof is applied so that the end of the screw is connected to the pressure plate or piston 24, the flanges 16 and 17 being disposed beneath the flanges 12 and 13 of the hollow body.

One of the sides of the hollow body is of reduced length providing a slot through which the pressure plate and piston can be inserted. When the parts are thus assembled the pressure plate will be in the end of the container adjacent the cap or closure and by rotation of the knurled disk 21 or head of the screw butter can be expelled from the open end of the container and can be applied as desired to foods, containers for foods, or the like.

It will be apparent from the foregoing that a holder for butter or other material of similar consistency is provided of simple construction consisting of only four parts which can be readily assembled for use and taken apart for cleaning.

It will be obvious to those skilled in the art that various changes may be made in the invention without departing from the spirit and scope thereof and therefore the invention is not limited by that which is illustrated in the drawing and described in the specification, but only as indicated in the accompanying claim.

What is claimed is:

A device for holding and dispensing butter or the like material comprising an elongated housing, the interior of which is square in cross-section, said housing having one end open, a closure for the other end of said housing, the walls of said open end being provided with one or more internal projections for retaining the contents of the housing against accidental discharge, the closure end of the housing having a pair of opposed flanges extending laterally outwardly from two of its opposed walls, said closure having downwardly and inwardly extending mating flanges slideably engaging said housing flanges and a threaded opening in said closure disposed axially of the housing when the closure is applied, stop means on the corresponding ends of the housing flanges for limiting the application of the closure, a pressure plate for disposition in said housing, a threaded shaft extending through the threaded opening in said closure for rotatable connection with said pressure plate whereby by rotation of said shaft said pressure plate can be moved endwise within said housing to expel the contents from the open end thereof.

References Cited in the file of this patent
UNITED STATES PATENTS

| | | |
|---|---|---|
| 955,617 | Tucker | Apr. 19, 1910 |
| 1,475,417 | Watson | Nov. 27, 1923 |
| 1,489,262 | Martin | Apr. 8, 1924 |
| 2,129,051 | Eastley | Sept. 6, 1938 |
| 2,559,889 | Matthews | July 10, 1951 |
| 2,589,000 | Vani | Mar. 11, 1952 |